United States Patent Office 3,505,091
Patented Apr. 7, 1970

3,505,091
PRODUCTION OF TITANIUM DIOXIDE PIGMENTS
Pedro Carlos Santos, Antioch, Calif., assignor to E. I. du Pont de Nemours and Company, Wilmington, Del., a corporation of Delaware
No Drawing. Continuation-in-part of application Ser. No. 456,522, May 17, 1965. This application July 29, 1968, Ser. No. 748,198
Int. Cl. C09c 1/36
U.S. Cl. 106—300                                5 Claims

ABSTRACT OF THE DISCLOSURE

Titanium dioxide pigment prepared by the oxidation of $TiCl_4$, vapor preferably containing a minor amount of $AlCl_3$ is improved with respect to resistance to chalking in coatings by carrying out the oxidation step at pressures of at least 20 p.s.i.g. and preferably between 30 and 175 p.s.i.g. Improvement with respect to hiding power is also obtained in this pressure range when an excess of oxygen is used and the reaction mixture is passed through a porous walled gas purged reaction zone, the length thereof being at least three times the diameter.

RELATED APPLICATIONS

This application is a continuation-in-part of co-pending application Ser. No. 456,522, filed May 17, 1965 and now abandoned.

BACKGROUND

The production of $TiO_2$ by the oxidation of $TiCl_4$ is well known (U.S. Patents 2,488,439; 2,559,638, etc.). As disclosed in these patents, the oxidation reaction is carried out by charging superheated reactants of titanium tetrachloride, oxygen-containing gases such as air or oxygen, and various additives, such as water vapor, and if desired, aluminum trichloride, into a closed reactor maintained at temperatures ranging from 900 to 1700° C. The resulting $TiO_2$ product on discharge from the reaction zone is quenched rapidly, for example as shown in U.S. Patent 2,833,627 to temperatures of 500 to 600° C. and the $TiO_2$ particles are suitably after-treated or finished to produce a pigment with various characteristics for many applications.

As demand shifts to titanium base pigments, especially the rutile modification, so shifts the importance of the flame process for producing $TiO_2$ by the $TiCl_4$ oxidation route—a most economical method for obtaining pigmentary rutile on an industrial scale. It appears that the surface of the pigment particles obtained from a flame oxidation procedure at the above-stated temperatures under normal atmospheric conditions contains some active sites not completely oxidized to $TiO_2$. These active sites may exert a deleterious effect on the chalking and fading characteristics of the pigment, especially when incorporated in coating compositions such as enamels and flat paints exposed to the atmosphere and sunlight.

It has been found that this disadvantage of the $TiO_2$ products from prior vapor phase $TiCl_4$ oxidation procedures can be effectively overcome. A principal object of this invention therefore is to provide novel and effective methods for production of $TiO_2$ pigment exhibiting improved resistance to chalking, from a $TiCl_4$ oxidation. Particular objects of the invention include the provision of useful and efficient methods for obtaining pigmentary titanium dioxide through the vapor phase oxidation of titanium tetrachloride with controlled particle size and other necessary pigment qualities, including essential color, tinting strength, opacity, hiding power and chalk resistance whereby production will be assured of an excellent high quality type pigment; the provision of a novel method for obtaining such pigment in rutile crystalline form and by an accelerated, controlled oxidation reaction carried out under critical super-atmospheric pressure conditions; and the provision of a novel process wherein the reaction between oxygen and titanium tetrachloride is effected in such a manner that substantial conversion of the titanium tetrachloride results. Further objects and advantages will become apparent from the ensuing, more detailed description of the invention.

SUMMARY OF THE INVENTION

These and other objects are accomplished in this invention which comprises producing pigment quality titanium dioxide in the rutile crystalline form advantageously improved in respect to chalking characteristics by decomposing titanium tetrachloride and from 0.1% to 10% by weight based on $TiCl_4$ of $AlCl_3$ in the vapor phase in a closed reaction vessel under controlled oxidation conditions and while maintaining the reactants under a critical super-atmospheric pressure of at least 20, and suitably from 20 to 400, pounds/square inch gage (p.s.i.g.). The product may be further improved with respect to hiding power and gloss by combining conditions of at least 15% excess oxygen over the stoichiometric requirement and a gas purged discharge reaction zone having a length at least three times its diameter with the elevated pressure.

In a more specific and preferred embodiment, the invention comprises producing pigment quality $TiO_2$, more specifically rutile, exhibiting unexpectedly improved chalkfade (C/F) properties, by reacting, at an elevated temperature in the vapor phase and over a controlled time period, relatively pure titanium tetrachloride with an oxygen containing gas in the presence of sufficient aluminum trichloride to provide in the final pigment from 0.5 to 10%, by weight, based on the $TiO_2$, of aluminum oxide and from 0.1% to 5% by volume of water vapor, said reaction being carried out while maintaining a pressure of from 20 to 200 and preferably from 30 to 125 pounds per square inch above atmospheric on the reactants, and thereafter recovering the resulting $TiO_2$ product and subjecting it to conventional $TiO_2$ pigment finishing treatment.

In one preferred adaptation of the invention, titanium tetrachloride vapor is continuously introduced into a suitable pressure-withstanding corrosion-resistant type reaction vessel, the reaction zone of which is maintained at a substantially constant temperature of about 1200 to 1500° C. Concurrently therewith, aluminum trichloride vapor, in amounts equivalent to from 0.1% to 3.0% by weight of the titanium tetrachloride, is introduced into the titanium tetrachloride vapor preheated to temperatures of from 400° C. to 650° C. prior to its introduction into the reaction vessel, the aluminum trichloride and titanium tetrachloride becoming thoroughly commingled and substantially completely and quickly reacted in the reaction zone with an oxygen-containing gas. The oxygen-containing gas is preheated to the range of 1500° C. to 1800° C. As a result of rapid homogeneous mixing of the reactants, substantially complete oxidation of titanium tetrachloride and aluminum trichloride takes place with formation of a $TiO_2$ product containing from 0.5 to about 3% $Al_2O_3$. In effecting such quick mixing and reaction, any conventional corrosion-resistant type of mixing and reaction vessel can be employed, provided it is of such design, construction and dimension that a continuous flow of reactants of products of reaction within and through its oxidation chamber can be effected and such control exercised over velocities, mixing rates, temperatures, reaction rates and retention times employed that on the average the reactants will remain in said chamber for limited short periods of time; for example, long enough to afford a substantially complete reaction but less than a period of time in which undesired pigment particle size growth would take place. With temperatures in the range indicated, retention times of from .001 to 1 second are preferred since nearly complete conversion of titanium tetrachloride and aluminum trichloride to their corresponding oxides occurs within that time. A particularly useful type of mixing and reaction vessel comprises the slot jet type of apparatus disclosed in U.S. Patent 2,653,078. This consists of a pipe line mixing device in which the reactants are separately fed at controlled velocities and quick mixing and reaction is brought about in the reaction zone by continuously charging one reactant into said zone in the form of a relatively thin, sheeted stream flowing from the periphery of the reaction vessel in a direction angular or radial to the axis of flow of the other reactant passing through said zone. The design of reaction chamber or zone can be such as that disclosed in U.S. 3,203,763, the walls of which are constructed of a foraminous refractory material through which a fluid gas or liquid can be forced under pressure from the exterior surfaces of said wall and to maintain the reactor wall free from residual titanium dioxide and corrosion products, and which, in a sense, thereby provides a gas shielded reaction zone. Obviously, the exterior pressure must be greater than the internal reactor pressure. Preferably, the wall is maintained free of materials building up by passing cool chlorine or nitrogen gas into said chamber through the porous walls and at such rates that the walls of the reactor are maintained at approximately 300° C. The desired pressure level may be maintained by means of a pressure release mechanism situated downstream from the reaction zone. This is preferably located at a point beyond which the pigment suspension in by-product gases has been cooled and separated. At the higher pressures, the cooling prior to separation of pigment should not drop the temperature to the dew point of any condensable liquids present. Since chlorine is the major condensable component, a temperature of 100° or higher will suffice for pressure up to 400 p.s.i.g.

During the commingling and oxidation of the reactants, a pressure is maintained in the enclosed reactor which is regulated by restricting the outlet gases, to at least 20 p.s.i.g. and preferably at above 25 p.s.i.g. to about 125 p.s.i.g. The gaseous pigment suspension (at temperatures of about 1200–1500° C.) issuing from oxidation reactor is immediately cooled to temperature below 600° C. in order to inhibit $TiO_2$ pigment particle size growth, which would otherwise occur due to cementation or sintering of loosely bound pigment aggregates. This can be effected by means of any conventional effective cooling operations such as recirculating cool product gases from the system and directly commingling them with the highly heated pigment suspension. One practical method is to pass it through cooling ducts which are water cooled such as those taught in U.S. 2,833,627 and passing through them into a cyclone-type collector with a star rotary type valve at the base of the cyclone with a restricted gas outlet at the top of the cyclone. The quenching is best done under reaction pressures. However, this is not necessary since the pressure can be dropped, if desired, prior to the quenching treatment. The recovered modified composite type $TiO_2$ pigment product which may contain, if desired, from 0.1 to 10% by weight $Al_2O_3$, is then subjected to standard finishing and milling or micronizing treatment well known in the pigment art. In the finished state it will be uniformly small in size, with an average particle size ranging from 0.1 to 5 microns and preferably from 0.1 to 0.25 micron. Being substantially neutral, small in particle size, soft texture and inherently high in tinting strength, color, opacity and other essential pigment properties, it will be readily adapted for use in a wide variety of pigment applications, especially in paints, enamels, finishes and similar protective coatings. Similarly, because of its improved, high resistance to chalking, it will be outstandingly useful in coating compositions where atmospheric conditions have a tendency to break down the binder or vehicle film in exterior applications.

When the critical pressure conditions discussed above are combined with the use of an excess of oxygen in the reaction and the use of a relatively long gas cooled porous wall reaction zone a surprising improvement in hiding power and gloss of the resulting pigment is observed. This invention, therefore, is also concerned with the improvement obtained by control of all three variables in the process. Other conditions are kept by known methods within the limits required for producing pigmentary $TiO_2$ of good quality as previously shown.

Reaction zone pressures ranging from 20 p.s.i.g. to 125 p.s.i.g. are satisfactory. Preferred pressures are in the 20 to 75 p.s.i.g. range and more preferably 30 to 50 p.s.i.g. Higher pressures of up to 200 are practical and up to 400 p.s.i.g. are commercially possible but entail additional engineering expense. Unless otherwise normal operation the raising of the reaction pressure to above 20 p.s.i.g. results in an improved chalk resistance as shown in the examples.

According to this invention the use of from 15 to 50% excess of oxygen in conjunction with both pressures in the stated range and the gas cooled porous wall reaction zone will not only yield a pigment of at least 10% better hiding power but enamel paint films formulated with it show better gloss in addition to the chalk resistance obtained by pressure alone. Excess oxygen is that oxygen fed into the reaction zone in excess of that required to react with the titanium tetrachloride and any added $AlCl_3$ according to the equations:

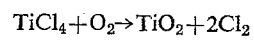

and

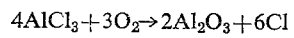

The oxygen is supplied preferably in substantially pure commercial form. Some dilution with inert gases such as nitrogen and chlorine is however possible. An example would be air enriched with oxygen to about 50 vol. percent or more.

These benefits of increased hiding power and gloss are obtained when a particular reaction zone is used in conjunction with the critical pressure and excess oxygen. The characteristic is an extension of the reaction zone at least three times as long as the diameter or shortest cross dimension. The elongated discharge area of the reaction zone is enclosed in a gas sheath obtained by the inflow of a gas through the porous wall of that section. A typical arrangement of apparatus for this purpose is shown in U.S. Patents 3,203,763 and 2,670,275, to which reference can be made for details. As taught in these patents the gas sheath, which appears to prevent build-up of the product on the wall, is obtained by forcing a suitable gas inwardly through the porous wall or by feeding a liquified gas through such a wall. In the latter case the evaporation of the liquid provides additional cooling. In the instant invention the shielding gases are preferably fed at a rate which keeps the walls below 400° C. and preferably below 300° C. The gas shielding as provided as close as mechanically expedient to the point of mixing of the reactants. Suitable gases for use here are chlorine, nitrogen, air, oxygen or $CO_2$. Chlorine seems preferred as being a by-product and economically most compatible with the system. Following passage through the gas shielded outlet the pigment suspension is further cooled and the pigment recovered by known means. This invention is particularly applicable to pigment finished according to pending U.S. Ser. Nos. 387,-790, 717,029 and 562,322 and its continuation-in-part July 15, 1968.

To a clearer understanding of the invention the following examples are given. These are merely illustrative and are not to be construed as in limitation of the underlying principles of the invention.

EXAMPLE I $TiCl_4$ vapor containing 1% by weight of vaporized $AlCl_3$ was heated and continuously admitted at a rate equivalent to 100 parts by weight per hour to the upstream portion of a horizontal reactor having a portion thereof 8″ in dia. x 9″ long constructed of porous nickel and cooled by means of nitrogen purging through its porous wall similar to that described in U.S. 2,670,272. Simultaneously, preheated oxygen metered through a separate inlet adjacent to the titanium tetrachloride inlet was continuously admitted to said chamber at a rate equivalent to 19 parts by weight of oxygen per hour. Trace amounts of KCl dissolved in water were added as a metal ion nucleant to aid in particle size control as disclosed in British Patent 922,671 and U.S. Patent 3,208,866. The two reactant streams were rapidly mixed in an upper portion of the reactor and a reaction temperature of 1300–1500° C. was maintained in the reaction zone. Prior to start-up of the reaction, the reactor pressure was built up to super-atmospheric pressure of 30 p.s.i.g. by introducing heated, oxygen-bearing gas, the reaction pressure varying during the run between 30 and 33.5 p.s.i.g. After the admission of reactants, the flow rates used provided an average retention time of reactants and products within the reaction chamber of about 0.15 second. The gaseous suspension of $TiO_2$–$Al_2O_3$ pigment formed in the reactor was discharged therefrom at a temperature of about 1100° C. and was quickly cooled. The co-oxidized alumina-titanium dioxide pigment was then separated from the cooled gaseous products by passing the suspended pigment particles and gases into an associated cyclone separating device and was discharged from the bottom of said device via a rotary-type star valve. The exhaust gases were bled off through the pressure release valve and recycled to the chlorination furnace. A substantially 100% conversion of titanium tetrachloride and aluminum chloride to their respective oxides, especially rutile in the case of $TiO_2$, was obtained with the resulting composite rutile pigment containing about 98.8% rutile and 1.2% $Al_2O_3$. The recovered titanium dioxide pigment was then treated by conventional pigment treatment procedures and ground to desired texture in a fluid energy mill. It was found to posses exceptional chalk resistance characteristics. Upon incorporating this pigment in a conventional blue tinted alkyd resin coating composition and exposing the coating for a period of 6–7 months to the elements, it was found to exhibit an improved chalk-fade value of from 6–9 points on a 10/20 scale when compared to a similar $TiO_2$ pigment but prepared from a conventional non-pressure type of $TiCl_4$–$AlCl_3$ oxidation.

To appreciate the advantages afforded in the invention and the significance of the results obtained in this invention, an understanding of chalking resistance must be delineated. In general, pigments are tested in an air dried automotive enamel formulation tinted a medium blue and exposed at an angle of 45° south exposure in Florida. After a period of time, varying from 1 to 4 months, a white film appears on the exposed surface of the panel. This white substance is known as "chalk" and is composed of titanium dioxide and paint solids which have separated from the paint film due to photochemical decomposition of the film. The rating of the amount of this "chalk" by a red light reflectance test, compared to the amount on panels containing standard pigments comprises the chalk-fade determination. The chalk-fade scale is set up by considering the pigments falling under U.S. Federal specifications developed by the General Services Administration of the Federal Supply Service, TT–P–442, IIA, when applied to a chalk panel to have a value of 20, whereas standard TT–P–442, IIIB, is assigned a rating of 10 on the chalk-fade scale. The following Table I shows the formulation generally used for preparing samples for chalk-fade evaluation.

TABLE 1.—AUTOMOTIVE REFINISH ENAMEL, ALKYD RESIN BALL MILL GRINDS

| Mill Charge [1] | Grams | Lbs./100 gals. |
|---|---|---|
| Phthalocyanine blue | 5.0 | 21.3 |
| TiO₂ (rutile) | 40.0 | 170.6 |
| Alkyd baking resin (50% solids) | 100.0 | 426.4 |
| Mineral spirits | 30.0 | 127.9 |
| Xylene | 30.0 | 127.9 |
| 24% lead naphthenate | 1.5 | 6.4 |
| 6% cobalt napthenate | 0.22 | 0.9 |
| 6% manganese naphthenate | 0.12 | 0.5 |
| Total | 206.84 | 881.9 |

[1] Pint glass jar mills, grind 42 hours. Glass Balls (½″ Diam.)

Formulation constants:
  Pigment binder (by wt.)—90/100
  Pigment volume conc.—21.8%
  Percent tint (on total pigment wt.)—11.1%
  Gallon wt. (lbs.)—8.8
  Enamel viscosity—21 seconds—10F Cup
  Enamel spray viscosity—18–19—10F Cup

TABLE 2.—PANEL PREPARATION

Aluminum panels—4″ x 12″
Anti-corrosion primer-coating
Test code application—Automatic spray (1.4 mils (±.2))
Drying schedule—Air dry, 5 days min.

Exposure: 45° S in Florida and Delaware

EXAMPLE II

To demonstrate more effectively the effect which pressure exerts on the chalking characteristic of a $TiO_2$ pigment prepared by the oxidation of $TiCl_4$, a series of runs were made in equipment and in a manner similar to that described in Example I. In these runs, summarized in Table 3 below, the production rate and the amount of co-oxidized $Al_2O_3$ (added as $AlCl_3$ vapor) was varied and pressure to demonstrate that an unexpected sizeable increase in chalk-resistance is obtained and is dependent upon maintenance of a pressure above 20 p.s.i.g.

TABLE III

| Reactor pressure | C/F [1] | Percent Al₂O₃ | O₂ Conc. Vol. percent | O₂ Excess, percent | Reaction zone temperatures | Metal ion nucleant, p.p.m. |
|---|---|---|---|---|---|---|
| 10 | −1 | 0.77 | 83 | 18 | 1,350–1,400 | 0 |
| 10 | 0 | 0.77 | 83 | 18 | 1,350–1,400 | 0 |
| 11.5 | 6 | 1.36 | 90 | 5 | 1,380–1,450 | 95 |
| 11.5 | 6 | 1.36 | 90 | 5 | 1,350–1,400 | 147 |
| 14 | 10 | 1.3 | 80 | 20 | 1,400–1,450 | 0 |
| 16 | 12 | 0.83 | 83 | 18 | 1,380–1,450 | 0 |
| 17 | 12 | 0.83 | 83 | 18 | 1,350–1,400 | 0 |
| 21 | 16 | 1.30 | 83 | 24 | 1,350–1,400 | 0 |
| 25 | 18 | 1.04 | 83 | 24 | 1,380–1,430 | 260 |
| 30 | 17 | 1.0 | | 50 | 1,390–1,450 | |
| 35 | 17 | 1.0 | | 50 | 1,380–1,440 | |
| 40 | 17 | 1.0 | | 50 | 1,390–1,430 | |
| 45 | 18 | 1.1 | | 13 | 1,350–1,410 | 435 |
| 45 | 20 | 1.1 | | 13 | 1,370–1,420 | 350 |
| 50 | 22 | 1.1 | | 13 | 1,370–1,420 | 300 |
| 70 | (²) | 1.0 | 95 | 23 | | 400 |

[1] Chalk-fade rating.
[2] Not available.

These data show that with use of pressures below 20 p.s.i.g. in the reactor, the best chalk-fade results obtainable are in the range of 9–12 on the previously described 10–20 scale, and that an immediate improvement in the chalk-fade characteristic to a value of 16 and above is realized when the perssure is increased above about 20 p.s.i.g. on the 10–20 scale, the best result of 22 is realized when the pressure is raised to 50 p.s.i.g. in the reactor.

As previously stated when the operation at pressures above 20 p.s.i.g. is combined with an excess of oxygen and a relatively long gas shielded outlet, one obtains improved hiding power and gloss characteristics in the pigment. These properties are measured in the following manner.

Hiding power

This property is tested in an architectural enamel formulation made up as follows:

|  | Gms. |
|---|---|
| $TiO_2$ to be tested | 500 |
| Modified soya—alkyd drying oil | 170 |
| Mineral spirits | 77 |

This mixture is ball milled five hours at 80 r.p.m. in a 0.4 gallon porcelain mill of 6" outside diameter. This ground base is then reduced as follows:

|  | Gms. |
|---|---|
| Base | 112 |
| Mod. soya alkyd drying oil | 135 |
| 24% lead naphthenate | 1.62 |
| 6% cobalt | .65 |
| Antiskinning agent | .25 |

This mixture is shaken 10 minutes in a sealed paint can. The paint is aged over night before measuring its hiding power. Control and standard samples are similarly prepared.

Hiding power determination

A film of prepared paint is drawn on a Morest Chart Form 09, a glossy paper chart having black and white area, using a draw-down blade with an .003 inch clearance. When the film is dried, the reflectance over the white and black backgrounds are measured using a Gardner Automatic Multipurpose Reflectometer. From this reading the contrast ratio is determined:

$$\text{Contrast ratio} = \frac{\text{reflectance over black}}{\text{reflectance over white}}$$

Similarly, the contrast ratio is determined on a standard pigment. The relative hiding power of the samples is calculated as:

$$H.P. = \frac{\text{contrast ratio of sample}}{\text{contrast ratio of standard}} \times 100$$

The gloss test

"Gloss" is a term used to describe the optical smoothness of a reflecting surface such as that of an enamel paint. The gloss of a paint surface is affected by coarse particles in a pigment used. The quality of a pigment, in this respect, is best observed by actually preparing the paints under standardized conditions and optically examining the surface. The products of the example and the control were incorporated in a gloss sensitive, alkyd-amino resin vehicle (Ford M30–J automotive baking enamel) and thinned with volatile solvent to spraying consistency and sprayed onto panels. After drying and baking, the panels were compared in a standardized gloss meter. In the gloss meter a focused light beam was directed onto the enamel surface at a 20 degree incident angle. A photoelectric meter was placed to intercept the reflected beam and measure its intensity. Higher readings on the meter indicated the better gloss since surface imperfections cause diffused reflection which does not reach the photometer. The gloss meter was standardized with respect to the intensity of incident light and the portion of reflected light reaching the photocell, against a glass plate corresponding to a value on an arbitrary gloss scale. The experimental samples and controls may thus be compared and given a significant numerical relative gloss rating.

EXAMPLE III

This example illustrates the combined effect of elevated pressure, excess oxygen and use of the long gas shielded outlet on hiding power, and gloss characteristics of the resulting pigment.

Using a reactor having a foraminous nickel wall adapted to be supplied with nitrogen gas and being 6" I.D. x 27" long, titanium tetrachloride is oxidized as follows:

62.7 pound mols of $TiCl_4$ and 0.98 pound mols of $AlCl_3$ per hour are fed as a vapor mixture at 450° C. to the reactor inlet. Air enriched with oxygen to about 50 mol percent oxygen is preheated and fed to the inlet end at 1500–1600° C. This gas mixture also contains 2.5 vol. percent water vapor. KCl is also fed in at a rate to give 3–15 parts per million based on the $TiO_2$ being produced. The oxygen containing gas stream is fed at a rate to give 75 to 80 pound mols per hour of oxygen ($O_2$), this being a 25 to 30% excess over the theoretical requirement. The flow of reactants and reaction zone pressure of 50 p.s.i.g. is maintained by providing somewhat higher pressures at the source of the reactants and metering them into the reactor where the desired pressure is maintained by control of the discharge valve. The purge gas, nitrogen is similarly fed to the jacket of the nickel wall at a rate sufficient to maintain the inner foraminous wall temperature below about 400° C. The flow in this case varies widely and may range from 1000 to 2000 pounds per hour. The upper limit is not critical insofar as obtaining the pigment improvement but it is preferably kept at near the minimum for economy and to avoid volume overloading of the other facilities where chlorine recovery is practiced. Pertinent pigment properties obtained by this procedure are set forth as A in the Table 4, along with values for control pigments.

The control B is made in the same manner but with a reaction zone pressure of only 10 p.s.i.g. Another control representing use of a short purged outlet, about 9 inches, but with the same pressure and excess oxygen is listed as C. Control D represents the product of nearly stoichiometric oxygen with the long outlet and high pressure. All the samples are given hydrous oxide treatments, dried and micronized.

TABLE IV

|  | A | B | C | D |
|---|---|---|---|---|
| Reaction press. p.s.i.g | 50 | 10 | 50 | 50 |
| Outlet dia. (in.) | 6 | 6 | 6 | 6 |
| Outlet length in(.) | 27 | 27 | 9 | 27 |
| Outlet length/diameter | 4.5 | 4.5 | 1.5 | 4.5 |
| Excess $O_2$, percent | 25–30 | 25–30 | 25–30 | 10 |
| Hiding power [1] | 110 | 98 | 99 | 100 |
| Gloss | 78 | 75 | 78 | 75 |
| C/F | 20 | (−1) | 20 | 20 |
| Purge gas rate [2] | 1,500 | 1,500 | 555 | 1,500 |

[1] A comparable commercial $TiO_2$ pigment was used as the standard for H.P.=100.
[2] $N_2$ purge gas flow in pounds per hour. For the short outlet in C the flow was cut in proportion to the length to give the same shielding effect.

In addition to improvement in chalk-fade, hiding power and gloss the product obtained by use of all three conditions simultaneously namely, high pressure, excess oxygen and a gas purged outlet with a length to diameter ratio of at least three shows improved dispersion in gloss paint prepared by low shear stirring rather than grinding. By this is meant that fewer coarse specks of pigment agglomerates appear when the paint is drawn on a Hegman fineness gage.

What is claimed is:

1. A process for preparing a rutile $TiO_2$ pigment improved in chalk resistant properties which comprises oxidizing $TiCl_4$ vapor and from 0.1% to 10% by weight based on $TiCl_4$ of vaporous $AlCl_3$ in a closed reactor with an oxygen-containing gas at temperatures ranging from 900–1700° C. and throughout the reaction maintaining the reactants and reaction products under a pressure of at least 20 p.s.i.g.

2. A process for producing pigmentary rutile $TiO_2$ improved in respect to chalking characteristics which comprises reacting within a closed reaction zone at temperatures ranging from 900 to 1700° C. vaporous $TiCl_4$ and 0.1% to 10% by weight based on $TiCl_4$ of vaporous $AlCl_3$, with an oxygen-containing gas in the presence of from 0.1% to 5% by volume of water vapor, based on the total volume of gaseous reactants, effecting said reaction while maintaining pressures ranging from about 30 to 125 lbs. per square inch above atmospheric pressure on the reactants and reaction products, quickly quenching the $TiO_2$-containing products of reaction to a temperature below 600° C. upon their discharge from said reaction zone, and subjecting the resulting TiO$_2$ pigment to a finishing treatment.

3. A process for producing pigmentary rutile TiO$_2$ of improved chalk resistant characteristics comprising reacting within a closed reaction zone at temperatures ranging from about 1200 to 1500° C. gaseous TiCl$_4$ preheated to temperatures ranging from 400 to 650° C., and from .1% to 3% by weight based on TiCl$_4$ of vaporous AlCl$_3$, with an oxygen-containing gas preheated to the range of 1500 to 1800° C. and containing from 0.1% to 5% by volume of water vapor, based on the total volume of gaseous reactants, effecting said reaction while maintaining a pressure ranging from 30 to about 50 lbs. per square inch above atmospheric pressure, quickly quenching the TiO$_2$-containing products of reaction to a temperature below 600° C. upon their discharge from the reaction zone, and then subjecting the resulting TiO$_2$ pigment to disintegrating milling to improve its texture characteristics.

4. In a process for producing titanium dioxide pigment having improved chalk resistance, hiding power and gloss wherein titanium tetrachloride vapor, from 0.1% to 10% by weight based on the TiCl$_4$ of vaporous AlCl$_3$ and oxygen are reacted at temperatures from 900–1700° C. the improvement comprising conducting said reaction at a pressure in excess of 20 p.s.i.g., and an excess of oxygen ranging from 15 to 50% over the stoichiometric requirement, in a reaction zone the terminal or outlet portion of which has a length dimension at least three times its diameter, said outlet portion being laterally bounded by a porous wall cooled by purge gas flowing inwardly through said wall.

5. The process of claim 4 in which aluminum trichloride vapor equivalent to from 0.5 to 10% of Al$_2$O$_3$, based on the TiO$_2$ being produced, is mixed with the titanium tetrachloride vapor prior to oxidation.

References Cited

UNITED STATES PATENTS

| | | |
|---|---|---|
| 2,653,078 | 9/1953 | Lane. |
| 2,670,272 | 2/1954 | Nutting. |
| 3,208,866 | 9/1965 | Lewis et al. |
| 3,219,411 | 11/1965 | Cheever et al. |
| 2,488,439 | 11/1949 | Schaumann. |
| 2,559,638 | 7/1951 | Krchma et al. |
| 3,203,763 | 8/1965 | Kruse _____ 23—202 |

FOREIGN PATENTS

| | | |
|---|---|---|
| 926,716 | 5/1963 | Great Britain. |

TOBIAS E. LEVOW, Primary Examiner

H. M. S. SNEED, Assistant Examiner

U.S. Cl. X.R.

23—302